US012596006B2

(12) United States Patent

Prikhodko et al.

(10) Patent No.: US 12,596,006 B2

(45) Date of Patent: Apr. 7, 2026

(54) SYNCHRONIZED MASS GYROSCOPE WITH FULL SYMMETRY AND TURNABILITY

(71) Applicant: Analog Devices, Inc., Wilmington, MA (US)

(72) Inventors: Igor P Prikhodko, Bourne, MA (US); Gaurav Vohra, Sudbury, MA (US); Arthur Yurievich Savchenko, Andover, MA (US); Xin Zhang, Acton, MA (US)

(73) Assignee: Analog Devices, Inc., Wilmington, MA (US)

( * ) Notice: Subject to any disclaimer, the term of this patent is extended or adjusted under 35 U.S.C. 154(b) by 406 days.

(21) Appl. No.: 18/300,053

(22) Filed: Apr. 13, 2023

(65) Prior Publication Data

US 2024/0003684 A1 Jan. 4, 2024

Related U.S. Application Data

(60) Provisional application No. 63/357,861, filed on Jul. 1, 2022.

(51) Int. Cl.
*G01C 19/5712* (2012.01)

(52) U.S. Cl.
CPC ................................ *G01C 19/5712* (2013.01)

(58) Field of Classification Search
CPC ............ G01C 19/5712; G01C 19/5733; G01C 19/5726
See application file for complete search history.

(56) References Cited

U.S. PATENT DOCUMENTS

| | | | |
|---|---|---|---|
| 8,266,961 B2* | 9/2012 | Kuang | G01C 19/5712 73/504.16 |
| 9,207,081 B2* | 12/2015 | Geen | G01C 19/5776 |

(Continued)

FOREIGN PATENT DOCUMENTS

| | | |
|---|---|---|
| CN | 117330041 A | 1/2024 |
| EP | 3043146 A2 | 7/2016 |

OTHER PUBLICATIONS

"European Application Serial No. 23168935.7, Extended European Search Report mailed Dec. 7, 2023", 10 pgs.

(Continued)

*Primary Examiner* — David J Bolduc

(74) *Attorney, Agent, or Firm* — Schwegman Lundberg & Woessner, P.A.

(57) ABSTRACT

A gyroscope includes a substrate, a proof mass coupled to the substrate and configured to move in direction of an X axis and in direction of a Y axis orthogonal to the first axis, an X axis shuttle to selectively drive the proof mass along the X axis as a drive axis or sense movement of the proof mass along the X axis as a sense axis in response to the proof mass driven along the Y axis as the drive axis, and a Y axis shuttle to selectively sense movement of the proof mass along the Y axis as a sense axis in response to the proof mass driven along the X axis or drive the proof mass along the Y axis as the drive axis. The X axis shuttle is symmetric to the Y axis shuttle along a diagonal axis that is diagonal to both the X axis and the Y axis. The X and Y axis shuttles have gaps designed for a predetermined DC voltage to generate spring softening (negative cubic nonlinearity) that is equal to spring hardening (positive cubic nonlinearity), ensuring linear motion at high amplitudes (⅓ of the capacitive gap).

20 Claims, 8 Drawing Sheets

(56)          References Cited

U.S. PATENT DOCUMENTS

| | | | | |
|---|---|---|---|---|
| 10,823,569 | B1* | 11/2020 | Shao | G01C 19/5656 |
| 2004/0004520 | A1* | 1/2004 | Giousouf | G01C 19/5712 |
| | | | | 331/154 |
| 2004/0099739 | A1* | 5/2004 | Kuo | G02B 6/359 |
| | | | | 235/454 |
| 2004/0211257 | A1* | 10/2004 | Geen | G01C 19/5712 |
| | | | | 73/504.04 |
| 2005/0150296 | A1* | 7/2005 | Painter | G01C 19/5719 |
| | | | | 702/147 |
| 2007/0214883 | A1* | 9/2007 | Durante | G01P 15/125 |
| | | | | 73/504.04 |
| 2010/0132463 | A1* | 6/2010 | Caminada | G01C 19/5712 |
| | | | | 73/504.12 |
| 2010/0206071 | A1* | 8/2010 | Rocznik | G01C 19/5726 |
| | | | | 73/504.12 |
| 2010/0313657 | A1* | 12/2010 | Trusov | G01C 19/5747 |
| | | | | 73/504.16 |
| 2014/0352431 | A1* | 12/2014 | Leclerc | G01P 15/18 |
| | | | | 73/504.04 |
| 2015/0168146 | A1* | 6/2015 | Shcheglov | G01C 19/5733 |
| | | | | 73/504.13 |
| 2015/0260519 | A1* | 9/2015 | Boysel | G01C 19/5755 |
| | | | | 438/51 |
| 2016/0025493 | A1* | 1/2016 | Stewart | G01C 19/5733 |
| | | | | 73/504.12 |
| 2016/0109258 | A1* | 4/2016 | Boser | G01C 19/5705 |
| | | | | 73/504.12 |
| 2016/0202060 | A1* | 7/2016 | Liu | G01C 19/5776 |
| | | | | 73/504.12 |
| 2016/0231118 | A1* | 8/2016 | Trusov | G01C 19/5726 |

| | | | | |
|---|---|---|---|---|
| 2016/0305781 | A1* | 10/2016 | Piirainen | G01C 19/5733 |
| 2016/0341551 | A1* | 11/2016 | Cook | G01C 19/5733 |
| 2016/0370180 | A1* | 12/2016 | Naumann | G01C 19/5621 |
| 2017/0108336 | A1* | 4/2017 | Boysel | G01C 19/5712 |
| 2017/0191830 | A1* | 7/2017 | Maeda | G01C 19/5776 |
| 2018/0038692 | A1* | 2/2018 | Prati | G01C 19/574 |
| 2018/0172446 | A1* | 6/2018 | Prikhodko | G01C 19/567 |
| 2018/0172447 | A1* | 6/2018 | Prikhodko | G01P 15/14 |
| 2018/0188028 | A1* | 7/2018 | Jeong | G01C 19/5712 |
| 2018/0266823 | A1* | 9/2018 | Jandak | G01C 19/5755 |
| 2019/0017823 | A1* | 1/2019 | Shao | G01C 19/5769 |
| 2019/0072389 | A1* | 3/2019 | Prati | G06F 12/0817 |
| 2019/0113341 | A1* | 4/2019 | Nagata | G01C 19/5747 |
| 2021/0381832 | A1* | 12/2021 | Prikhodko | G01C 19/5712 |
| 2022/0057208 | A1* | 2/2022 | Prikhodko | G01C 19/5712 |
| 2022/0178696 | A1* | 6/2022 | Kaajakari | G01C 19/5649 |
| 2023/0296379 | A1* | 9/2023 | Prikhodko | G01C 19/5712 |
| | | | | 73/504.12 |
| 2023/0332890 | A1* | 10/2023 | Savchenko | G01C 19/5733 |

OTHER PUBLICATIONS

Langfelder, G, et al., "Silicon MEMS inertial sensors evolution over a quarter century", Microengineering, Institute of Physics Publishing, Bristol, GB, vol. 31, No. 8, (Jul. 14, 2021), 32 pgs.

Trusov, A A, et al., "Flat is not dead: Current and future performance of Si-MEMS Quad Mass Gyro (QMG) system", IEEE/Ion Position, Location And Navigation Symposium—Plans 2014, IEEE, (May 5, 2014), 252-258.

"European Application Serial No. 23168935.7, Response filed May 9, 2024 to Extended European Search Report mailed Dec. 7, 2023", 24 pgs.

* cited by examiner $f_y = I.E_{PID}\sin\theta + Q.Q_{PID}\cos\theta + I.k.\Omega_{virt}\cos\theta$ $f_x = I.E_{PID}\cos\theta - Q.Q_{PID}\sin\theta - I.k.\Omega_{virt}\sin\theta$

SYNCHRONIZED MASS GYROSCOPE WITH FULL SYMMETRY AND TURNABILITY

CLAIM OF PRIORITY

This application claims priority to U.S. Provisional Application Ser. No. 63/357,861, filed Jul. 1, 2022, which is incorporated by reference herein in its entirety.

FIELD OF THE DISCLOSURE

This document pertains generally, but not by way of limitation, to sensors that are micro-electromechanical systems (MEMS), and more particularly, to MEMS gyroscope sensors.

SUMMARY OF THE DISCLOSURE

MEMS include small mechanical devices performing electrical and mechanical functions that are fabricated using photo-lithography techniques similar to techniques used to fabricate integrated circuits. Some MEMS devices are sensors that can detect motion such as an accelerometer or detect angular rate or rotation rate such as a gyroscope. A capacitive MEMS gyroscope undergoes a change in capacitance in response to a change in rotation rate. However, MEMS gyroscopes can be susceptible to errors such as quadrature error and offset error.

MEMS gyroscopes have a movable proof mass that moves in response to an electrical drive signal. The drive motion is along a drive axis (e.g., an X axis) of the proof mass. When the moving proof mass experiences rotation, a Coriolis force causes movement in a sense axis direction orthogonal to the drive axis (e.g., a Y axis). The drive axis and sense axis can be any axes that are mutually orthogonal. Movement of the proof mass in the sense axis direction causes a detectable change in capacitance representative of the rotation of the proof mass. The vibration pattern can be at any angle not necessarily the X axis or Y axis. For instance, by applying forces equally along X and Y axes, the vibration pattern angle will be at 45 degrees.

In general, MEMS gyroscopes are asymmetric between the drive axis direction and the sense axis direction because the amplitude of motion of the Coriolis mode vibration is thousands of times less than the amplitude of motion of the drive mode vibration. The axial symmetry, however, is beneficial for reduction of cross-axis damping errors, minimizing mass and momentum imbalance—all of which contribute to gyroscope output drift. The present inventors have recognized, among other things, that use of an MEMS gyroscope with axial symmetry provides advantages due to its intrinsic self-calibration properties.

In one approach, a gyroscope includes a substrate and a proof mass coupled to the substrate and configured to move in direction of a first axis (e.g., an X axis) and in direction of a second axis orthogonal to the first axis (e.g., a Y axis). The gyroscope includes a first axis shuttle structure or axis shuttle, to selectively drive the proof mass along the first axis as a drive axis, or to selectively sense movement of the proof mass under rotation (e.g., Coriolis sensing) along the first axis as a sense axis in response to the proof mass being driven along the second axis as the drive axis. The gyroscope also includes a second axis shuttle to selectively sense movement of the proof mass along the second axis as a sense axis in response to the proof mass driven along the first axis, or to selectively drive the proof mass along the second axis as the drive axis. The first axis shuttle is symmetric to the second axis shuttle along a diagonal axis that is diagonal to both the first axis and the second axis.

In another aspect of the present subject matter, a method of operating an MEMS gyroscope includes driving the MEMS gyroscope along a first axis of the MEMS gyroscope as a drive axis, sensing a response of the MEMS gyroscope along a second axis orthogonal to the first axis as a sense axis, and turning the MEMS gyroscope and changing the drive axis to the second axis changing the sense axis to the first axis.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

MEMS gyroscopes can be susceptible to errors such as quadrature error and common mode offset error. Quadrature error can be caused by the vibrating direction of the proof mass not being fully in line with the driving direction, resulting in an undesired vibration component perpendicular to, or in quadrature with, the driving direction. Common mode offset error can be caused by unequal damping of the proof mass in the two mutually orthogonal directions.

A MEMS gyroscope that is symmetric has intrinsic self-calibration properties that can improve performance by several orders of magnitude. Self-calibration of the gyroscope involves periodically switching an axis of the gyroscope from a Coriolis sensing mode to a resonator drive mode. This periodic switching requires axial symmetry of features of the gyroscope and equal electrode gaps in axis shuttle structures of the two mutually orthogonal axes. This symmetry allows the drive axis and the sense axis of the gyroscope to be interchanged when the orientation of the gyroscope is turned ninety degrees. This "mode turnability" between resonator mode and Coriolis mode of the axes cancels out many common mode offset error terms and quadrature error terms that change sign by the turning of the gyroscope. This causes the error term to average out over time.

Figure 1:
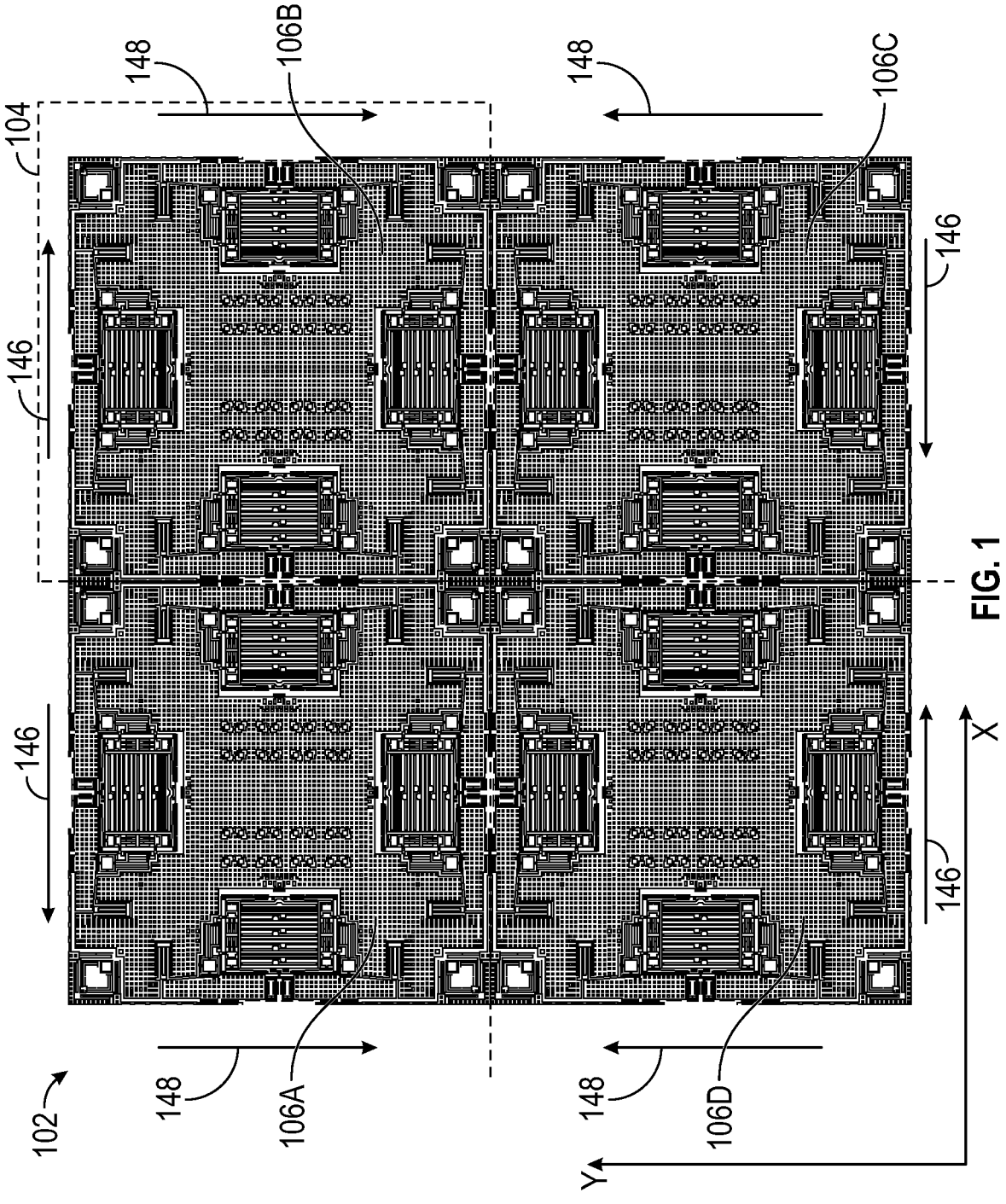
FIG. 1 is an example of a mode match micro-electromechanical system (MEMS) gyroscope.

FIG. 1 is an example of a mode match MEMS gyroscope 102. The gyroscope 102 includes four identical quadrants each including a moveable proof mass 106A-106 D coupled to a substrate. Each proof mass is movable in the direction of two mutually orthogonal axes. The axes in the example are a horizontal axis and a vertical axis labeled the X axis and the Y axis respectively, as an example, but the axes can be any mutually orthogonal axes. The first axis can be aligned to any in-plane or out-of-plane angle in three-dimensional (3D) space and the second axis is orthogonal to the first axis. Multiple gyroscopes can be assembled on surfaces with different angles. In an example intended to be illustrative and non-limiting, the multiple gyroscopes can be mounted on a four-sided pyramid with 45-degree surfaces to realize 3-axis sensing. In another example, multiple gyroscopes can be mounted on vertical or horizontal boards for 3-axis sensing.

Figure 2:
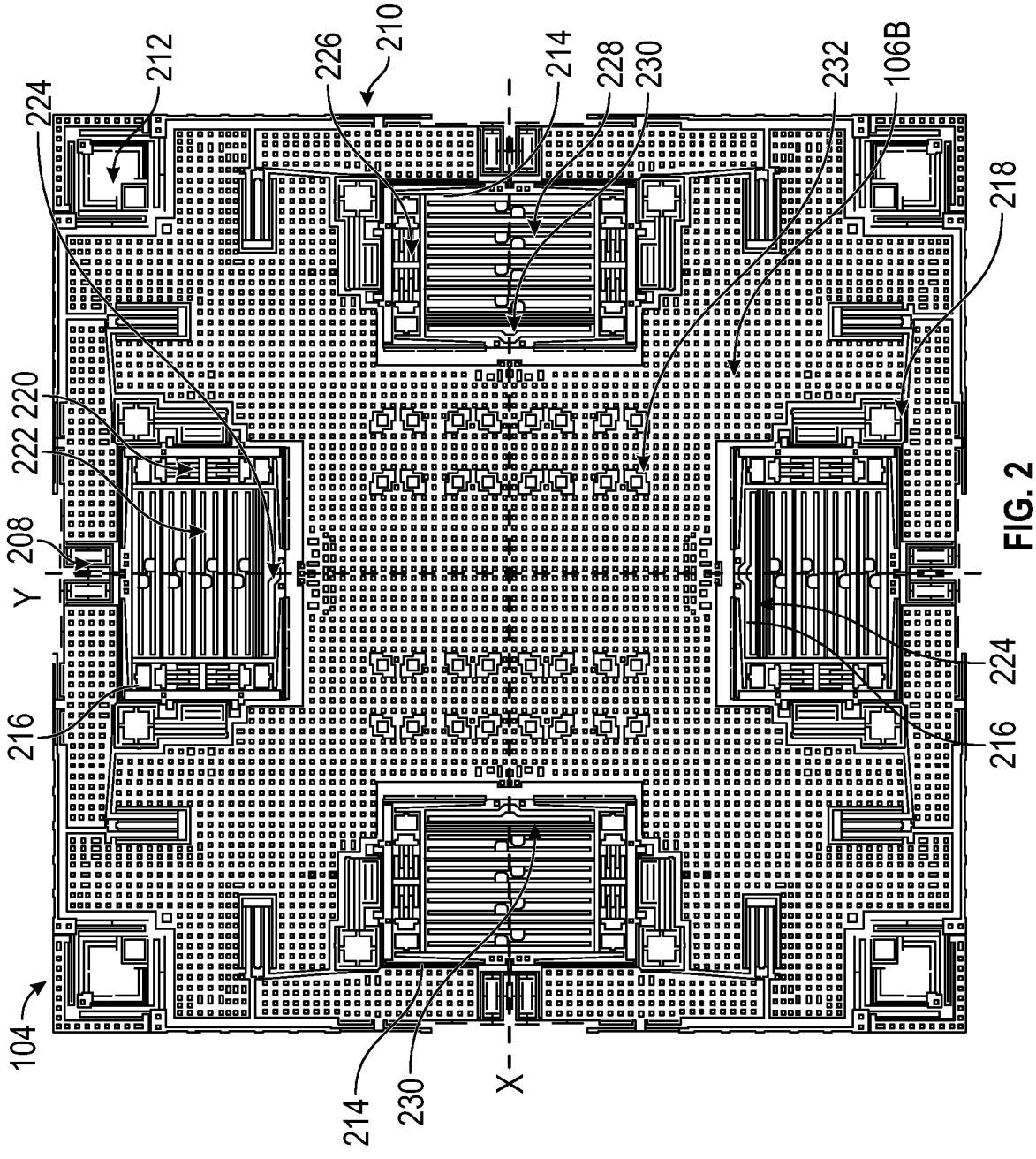
FIG. 2 is another example of a mode match MEMS gyroscope.

FIG. 2 is an example of a mode match MEMS gyroscope 104 that is one quadrant or one-fourth of the MEMS gyroscope of FIG. 1. The gyroscope 104 includes one proof mass 1106B coupled to the substrate. The gyroscope 104 also includes box linkage 208, outer couplers 210, and stress relieved anchors 212. The gyroscope 104 also includes shuttle structures or shuttle frames that can be referred to as "shuttles." The MEMS gyroscope 104 includes two shuttles 214 for the X axis and two shuttles 216 for the Y axis. The shuttles 214, 216 are coupled to the substrate by stress relieved frame anchors 218 and to the proof mass 106B with the box linkage 208 and a lever having a pivot point around frame anchors 218.

A shuttle 214, 216 is both a drive structure that causes the proof mass 106B to move in response to an electrical signal, and a sense structure that produces an electrical signal representative of movement of the proof mass 106B. The Y axis shuttles 216 include Y Force electrodes 220, Y sense or Y pickoff electrodes 222, and one or more V frequency tuning electrodes 224. The X axis shuttles 214 include X Force electrodes 226, X pickoff electrodes 228, and one or more X frequency tuning electrodes 230. The gyroscope 104 also includes quadrature electrodes 232 used for trimming to reduce quadrature error.

An X axis shuttle 214 and a Y axis shuttle 216 can be used interchangeably in either a drive mode to drive the proof mass 106B or a sense mode to sense a Coriolis effect on the proof mass 106B. As an example, if the V axis is the sense axis and is in a Coriolis sense mode and the X axis is the drive axis and is in a drive mode, the Y force electrodes 220 are Coriolis force electrodes, the pickoff electrodes 222 are Coriolis pickoff electrodes, and the tuning electrodes 224 are Coriolis tuning electrodes. The X force electrodes 226 are drive electrodes, the X pickoff electrodes 228 are velocity pickoff electrodes, and the X tuning electrodes 230 are resonant frequency tuning electrodes. Similarly, if the Y axis is the drive axis and the axis is the sense axis, the V force electrodes 220 are drive electrodes, the pickoff electrodes 222 are velocity pickoff electrodes, and the tuning electrodes 224 are resonant frequency tuning electrodes. The X force electrodes 226 are Coriolis force electrodes, the X pickoff electrodes 228 are Coriolis pickoff electrodes, and the tuning electrodes 230 are Coriolis tuning electrodes. To facilitate this mode match of the axes, several structures of the gyroscope 104 are symmetric.

Figure 3:
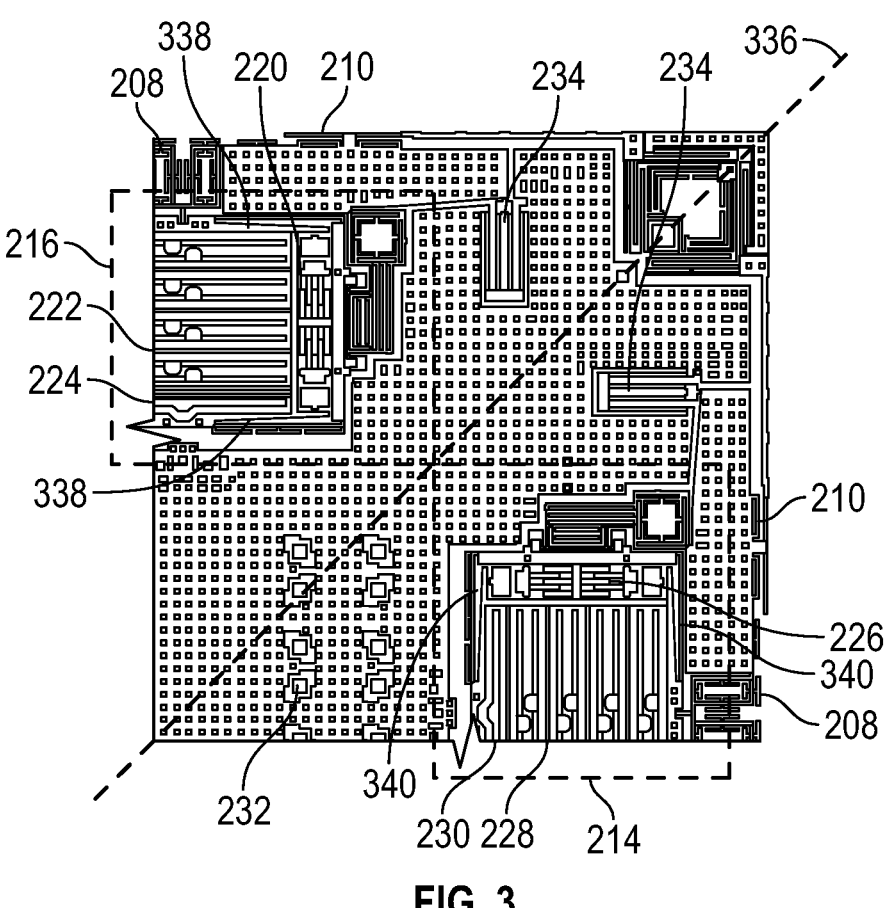
FIG. 3 is a portion of the MEMS gyroscope of FIG. 2.

FIG. 3 shows the upper right (me-fourth (¼) portion of the gyroscope 104 of FIG. 2, or the upper right one-sixteenth (¹⁄₁₀ portion of the gyroscope 102 of FIG. 1. A diagonal axis 336 is drawn through the portion of the gyroscope and shows that box linkage 208, outer couplers 210, and springs 234 are symmetric about the diagonal axis. FIG. 3 shows a portion of a Y axis shuttle 216 and an X axis shuttle 214. Many features of the Y axis shuttle 216 are symmetric to the X axis shuttle 214 about the diagonal axis 336. The Y force electrodes 220 are symmetric with the X force electrodes 226, the Y pickoff electrodes 222 are symmetric with the pickoff electrodes 228, and the Y tuning electrodes 224 are symmetric with the X tuning electrodes 230. Y axis shuttle springs 338 may or may not be symmetric with X axis shuttle springs 340.

Figure 4:
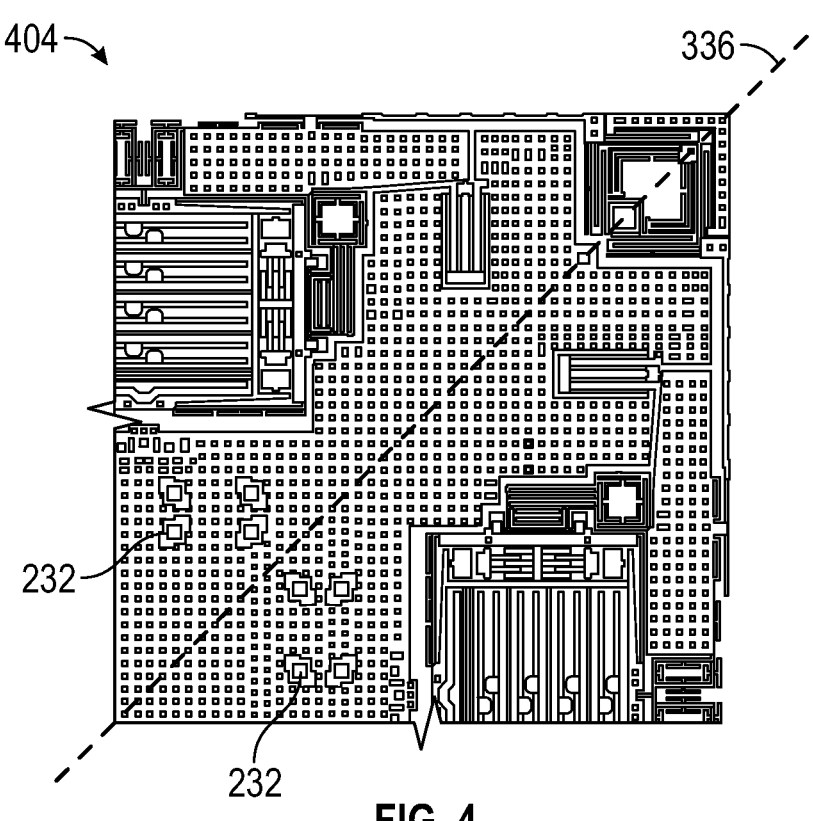
FIG. 4 is another example of a portion of a mode match MEMS gyroscope.

In the example of FIG. 3, the quadrature electrodes 232 are not symmetric about the diagonal axis 336 but can be placed symmetrically along the diagonal axis 336. FIG. 2 shows that the quadrature electrodes 232 are symmetric about either of the X axis or Y axis. FIG. 4 is another example of a ¹⁄₁₆ portion of a gyroscope 404 where the quadrature electrodes 232 are symmetric about a diagonal axis 336 of the gyroscope 404.

Returning to FIG. 2, the symmetry of the MEMS gyroscope 104 allows mode switching each of the two mutually orthogonal axes between drive mode and sense mode. As part of the mode switching, the gyroscope 104 can be turned ninety degrees (90°). If the drive axis and the sense axis are the X-axis and Y-axis respectively, this turning or flipping changes sensitivity of the Coriolis effect from the positive Z-axis to the negative Z-axis. The turning together with the mode switching between the axes, cancels out common mode errors due to coupling between the X-axis and Y-axis. The error canceling can be viewed as self-calibration to reduce the offset and quadrature error sources, such as cross-axis damping and other errors common between X and Y axes. The error reduction reduces the offset and quadrature error of the gyroscopes that results in much smaller as-born error signals, drift in error over time, and environmental stresses than is possible without the mode switching.

The movement of the shuttles 214, 216 is substantially the same as the movement of the proof mass 106B. For example, if the proof mass 106B moves two micrometers (2 μm), the frame of the shuttle moves 2 μm. As explained previously herein, the shuttles 214, 216 include parallel plate pickoff electrodes 222, 228, that are used to sense the Coriolis effect or velocity depending on the mode of the corresponding axis of the shuttles. The movement of a shuttle changes the size of the capacitive gap space between the pickoff electrodes. It is desired to have the change in gap size to be large (e.g., thirty-percent (30%) or more of the movement of the proof mass) for mode turnability. However, this much of a change in the gap size can lead to nonlinearities in the movement of the shuttle springs 338, 340, when it is desired for the shuttle springs 338, 340, to move linearly. Previous approaches addressed the non-linearity by using an asymmetric gyroscope design in which the displacement of the sense axis was kept small and turnability of the axes was not possible.

To reduce or eliminate the nonlinearity due to the large displacement of the shuttle springs 338, 340, the box linkage 208 and stress relieved anchors 212 have minimal positive nonlinear stiffness. In addition, negative nonlinear stiffness (that can be referred to as spring softening) is generated in the pickoff electrodes 222, 228, to tune the gaps produced between the electrodes. Gaps are designed for a particular DC voltage to generate spring softening (negative cubic nonlinearity) that is equal to spring hardening (positive cubic nonlinearity) due to shuttle displacement. This spring softening using voltage cancels the positive nonlinear stiffness (or spring hardening). The overall effect is that the motion frequency of the gyroscope is linear over the full displacement of the gaps. Further tuning of frequencies (over process variations) is done by applying a DC voltage to the frequency tuning electrodes 224, 230 to adjust the voltage difference across the gaps. Moreover, a control loop for tuning electrodes maintains the mode match condition over time, temperature, and environmental stress effects.

Multiple shuttle structures contribute to the total negative nonlinear stiffness K(–ve) including the pickoff electrodes 222, 228, the tuning electrodes and the quad electrodes or $$K(-ve)=K(-ve,\text{pickoffs})+K(-ve,\text{tuning})+K(-ve,\text{quad}).$$

The spring softness can be tuned so that the frequency of the drive mode for the X axis is the same as the frequency of the drive mode for the Y axis.

Figure 9:
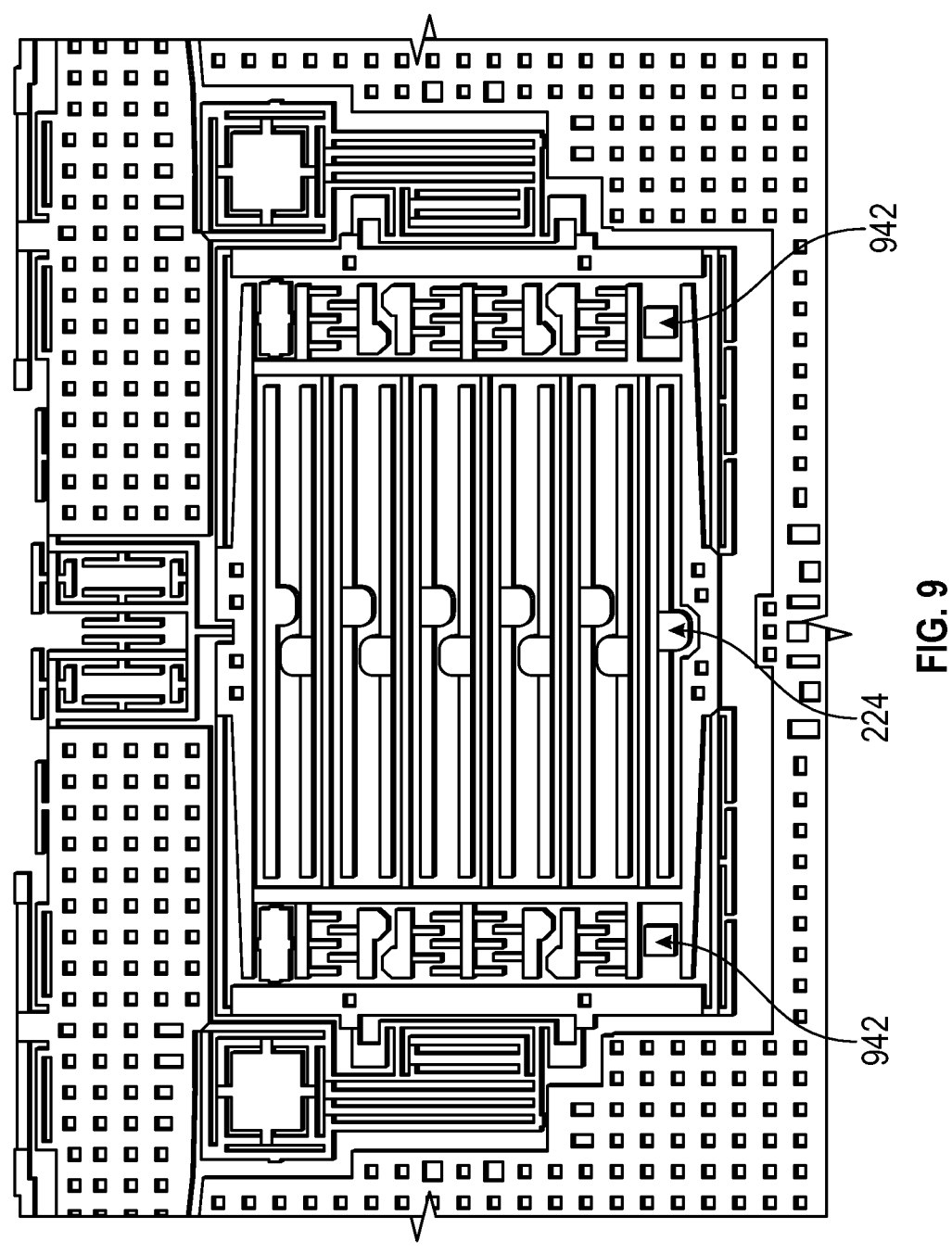
FIG. 9 is an example of an axis shuttle of a MEMS gyroscope.

The axis shuttles 214, 216, in FIG. 2 include primary frequency tuning electrodes 224, 230. The axis shuttles 214, 216, also include minor tuning electrodes. FIG. 9 shows axis shuttle 216 with primary frequency tuning electrode 224 and minor tuning electrodes 942. The minor tuning electrodes 942 enable higher resolution tuning of the frequency for the same voltage difference after the tuning with the primary frequency tuning electrodes 224, 230 is completed. In some examples, tuning is applied to the shuttles of the axis that has the highest frequency. Primary tuning may be performed first by trimming a DC voltage applied to the primary frequency tuning electrodes 224, 230. After the primary trim, a continuous AC closed mode matching loop uses the minor tuning electrodes 942 to match the drive and sense frequencies of the axes while gyroscope is running.

Returning to FIG. 1, the mode match MEMS gyroscope 102 includes four proof masses 106A-D and four quadrants—one quadrant four each proof mass. The movement of the proof masses is cross quadrant. For example, proof masses 106A and 106C may move with similar phase and proof masses 106B and 106D with similar phase 180 degrees out of phase with proof masses 106A and 106C. The arrows 146 in FIG. 1 show an example of driving to move the proof masses in the X axis direction. The arrows 146 show that proof masses 106A and 106C move together in the X axis direction, and proof masses 106B and 106D move together in the X axis direction. The arrows 148 show an example of the Coriolis force sense direction in the Y axis direction. The arrows 148 show that proof masses 106A and 106C move together in the Y axis direction, and proof masses 106B and 106D move together in the Y axis direction.

Figure 5:
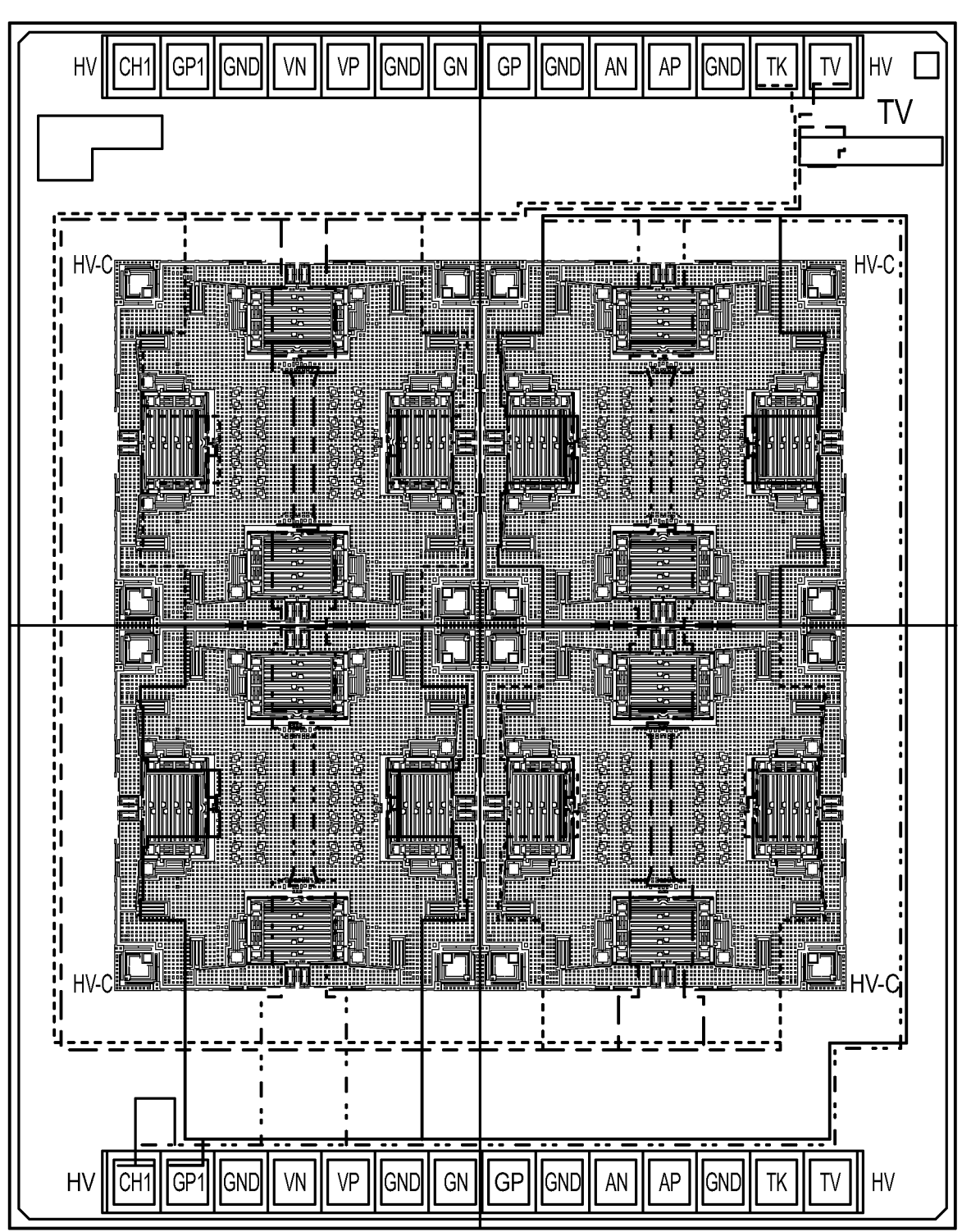
FIG. 5 is an example of cross quadrant routing of tuning signals in the mode match MEM gyroscope of FIG. 1.

The primary tuning and the minor tuning may be performed cross quadrant. The primary tuning electrodes of the upper left quadrant and the lower right quadrant may be electrically connected together. A cross diagonal tuning signal is provided to those cross quadrants and the cross quadrants are tuned together. Similarly, the primary tuning electrodes of the upper right quadrant and the lower left quadrant may be electrically connected together, and a cross diagonal tuning signal is provided to tune those cross quadrants together. FIG. 5 is an example of routing in the MEM gyroscope 102 to provide separate tuning signals to the upper left and lower right quadrants, and to the upper right and lower left quadrants.

Figure 6:
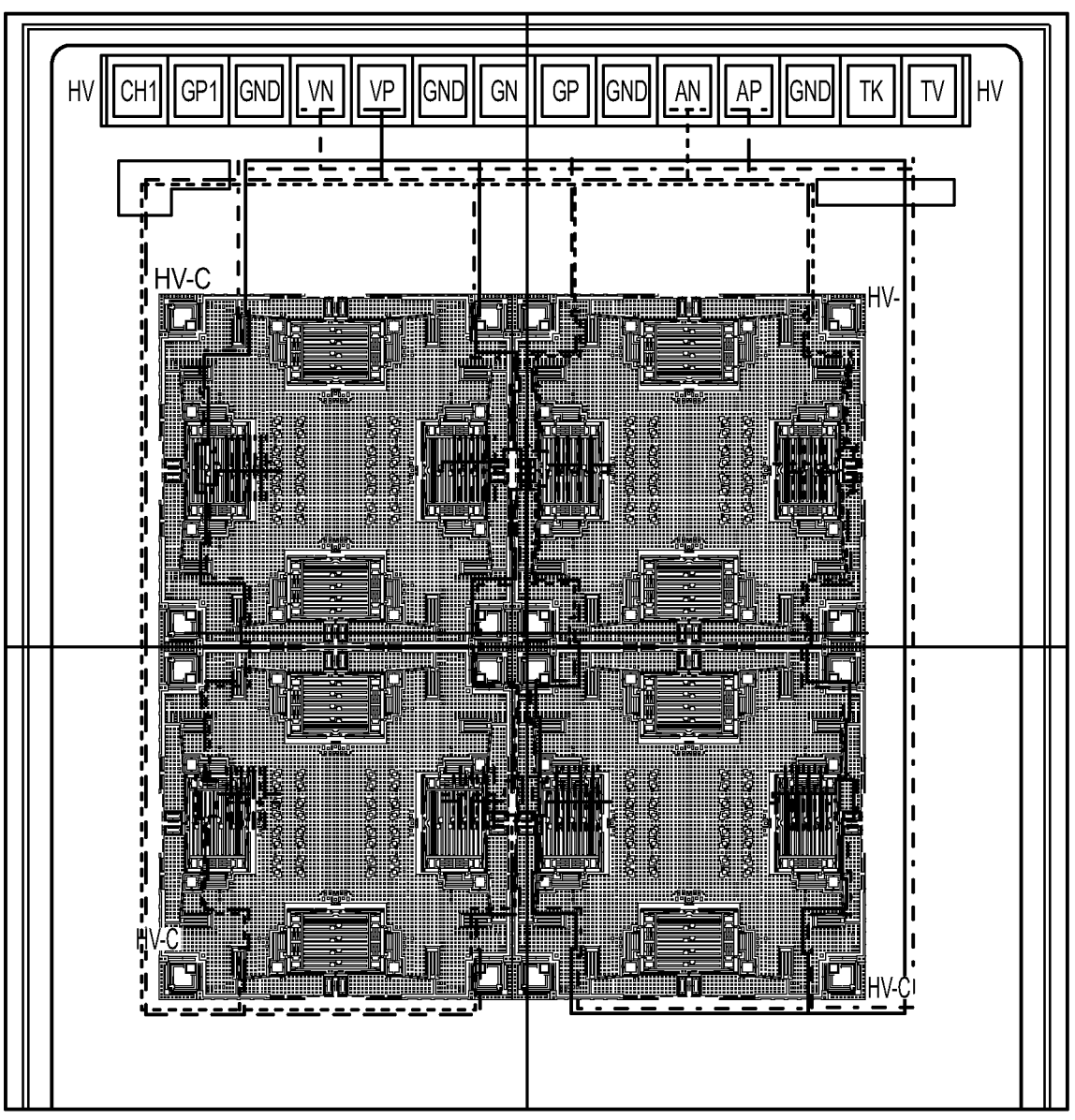
FIG. 6 an example of cross quadrant routing for X axis pickoff electrodes in the mode match MEM gyroscope of FIG. 1.

Driving and sensing may be performed cross quadrant. For example, if the X axis is the drive axis for the mode match MEMS gyroscope 102, and the Y axis is the sense axis for the mode match MEMS gyroscope 102, the X axis pickoff electrodes for the upper left quadrant and the lower right quadrant may be electrically connected together, and those X axis pickoff electrodes provide a combined signal representing displacement of the proof masses 106A and 106D. The X axis pickoff electrodes for the upper right quadrant and the lower left quadrant may be electrically connected together, and those axis pickoff electrodes provide a combined signal representing displacement of the proof masses 106B and 106D. FIG. 6 is an example of routing for the X axis pickoff electrodes.

Figure 7:
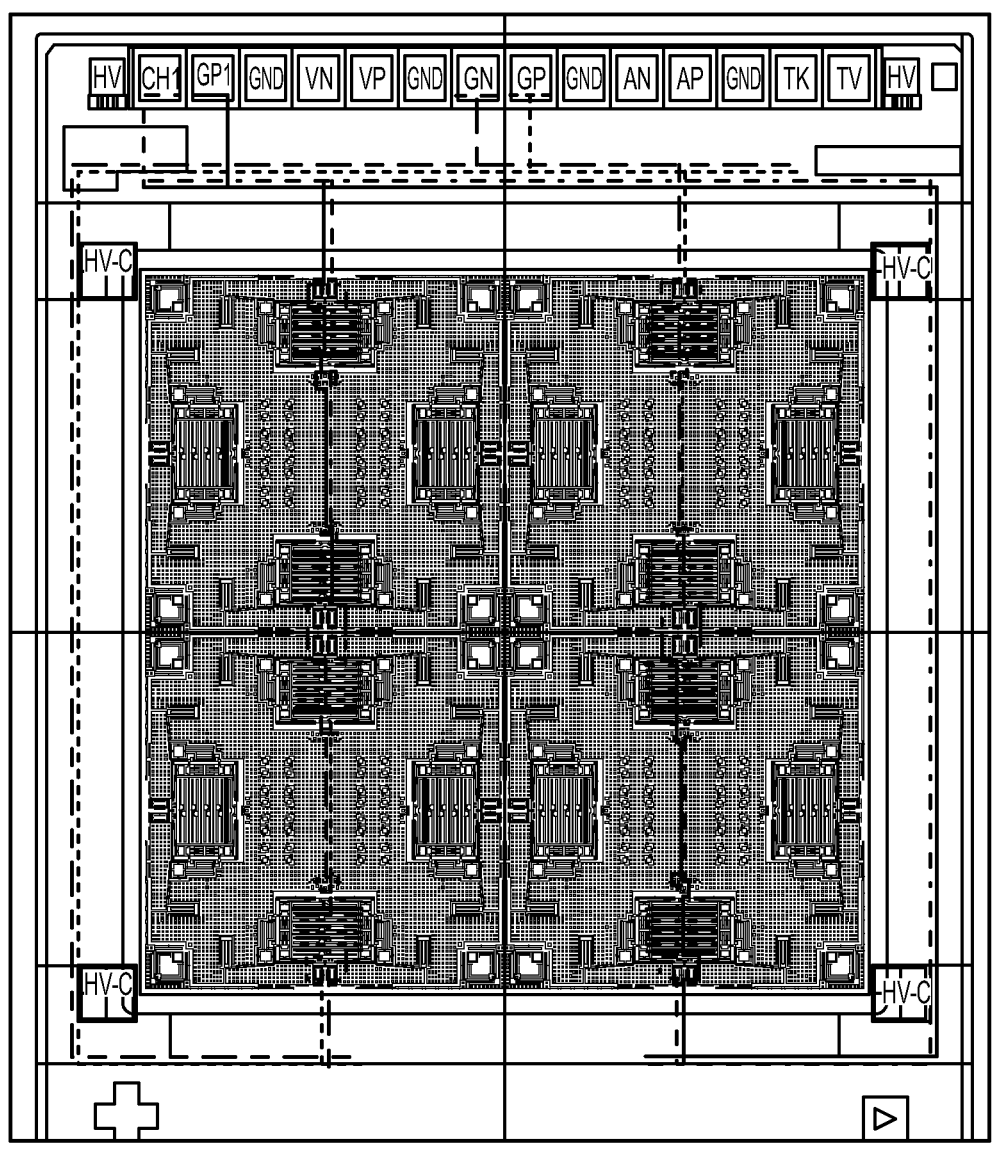
FIG. 7 an example of cross quadrant routing for Y axis pickoff electrodes in the mode match MEM gyroscope of FIG. 1.

Similarly, the Y axis pickoff electrodes for the upper left quadrant and the lower light quadrant may be electrically connected together, and those Y axis pickoff electrodes provide a combined signal for Coriolis force on the proof masses 106A and 106C. The Y axis pickoff electrodes for the upper right quadrant and the lower left quadrant may be electrically connected together and those Y-axis pickoff electrodes provide a combined signal for Coriolis force on the proof masses 106B and 106D. FIG. 7 is an example of routing for the Y axis pickoff electrodes.

The symmetry of the axis shuttles and the tunability of the axis shuttles 214, 216 allow for the turning and mode switching of the mode match MEMS gyroscope 102. The turning and mode switching periodically changes the axis of vibration from one axis (e.g., the X-axis) to the orthogonal axis (e.g., the Y-axis), which flips the sign of the scale factor of the sensed Coriolis signal so that errors (e.g., from cross-axis damping) are canceled. The turning and mode switching is performed periodically to change the principal axis of vibration (e.g., from the X-axis to the Y-axis) and back (from the Y-axis to the X-axis). The period of the turning should be faster than the time constant of bias instability of Allan Variance.

The output voltage of the MEMS gyroscope is converted to a rotation rate signal. During the flipping of the MEMS gyroscope 102, the gyroscope is turned off and the MEMS gyroscope 102 stops sensing. After flipping, the MEMS gyroscope 102 is turned on and the drive signal builds up the vibrations of the resonant movement to the desired displacement (e.g., 4 μm). During the flipping time, rate information is not available and would normally be lost and information from the gyroscope would be interrupted.

Recovering the rotation rate information would allow uninterrupted operation of the MEMS gyroscope 102. The rotation rate information can be determined from the electrostatic force ($F_{VIRT}$) used to turn the MEM gyroscope 102 from 0° to 90°. The flipping of the MEMS gyroscope 102 can be performed under open loop or closed loop control.

In open loop control, the electrostatic force used to turn the MEMS gyroscope 102 is constant, and a different value of force turns the DIEMS gyroscope at a different rate (e.g., in the range from 10 degrees per second (10°/sec) to 2000°/sec). The electrostatic force $F_{VIRT}$ acts as a virtual rotation rate $\Omega_{VIRT}$, $$\Omega_{VIRT}=F_{VIRT}/(2\omega\sqrt{E}),$$

where ω is the frequency of oscillation and E is energy. The turn time of the MEMS gyroscope is determined from the virtual rate. As an example, for a virtual rate of 2000°/sec, the turn time from 0° to 90° is 90/2000 or 45 milliseconds (45 ms), which corresponds to the gyroscope bandwidth of 22 Hertz. The physical rotation rate is obtained by subtracting the applied virtual slewing rate (in this example 2000°/sec).

In closed loop control, the electrostatic force $F_{VIRT}$ varies. For example, the control loop may be a Proportional-Integral-Derivative (PM) loop that changes the angle from 0° to 90° using a varying $F_{VIRT}$. For example, the PID angle control loop may change $F_{VIRT}$ to start at a fast rate at first (e.g., 10,000°/sec) and then a slow rate as it nears 90° for accuracy. The profile of the electrostatic force and the virtual rate are known. The virtual rate can be subtracted from the gyroscope output to get the physical rotation rate information.

Figure 8:
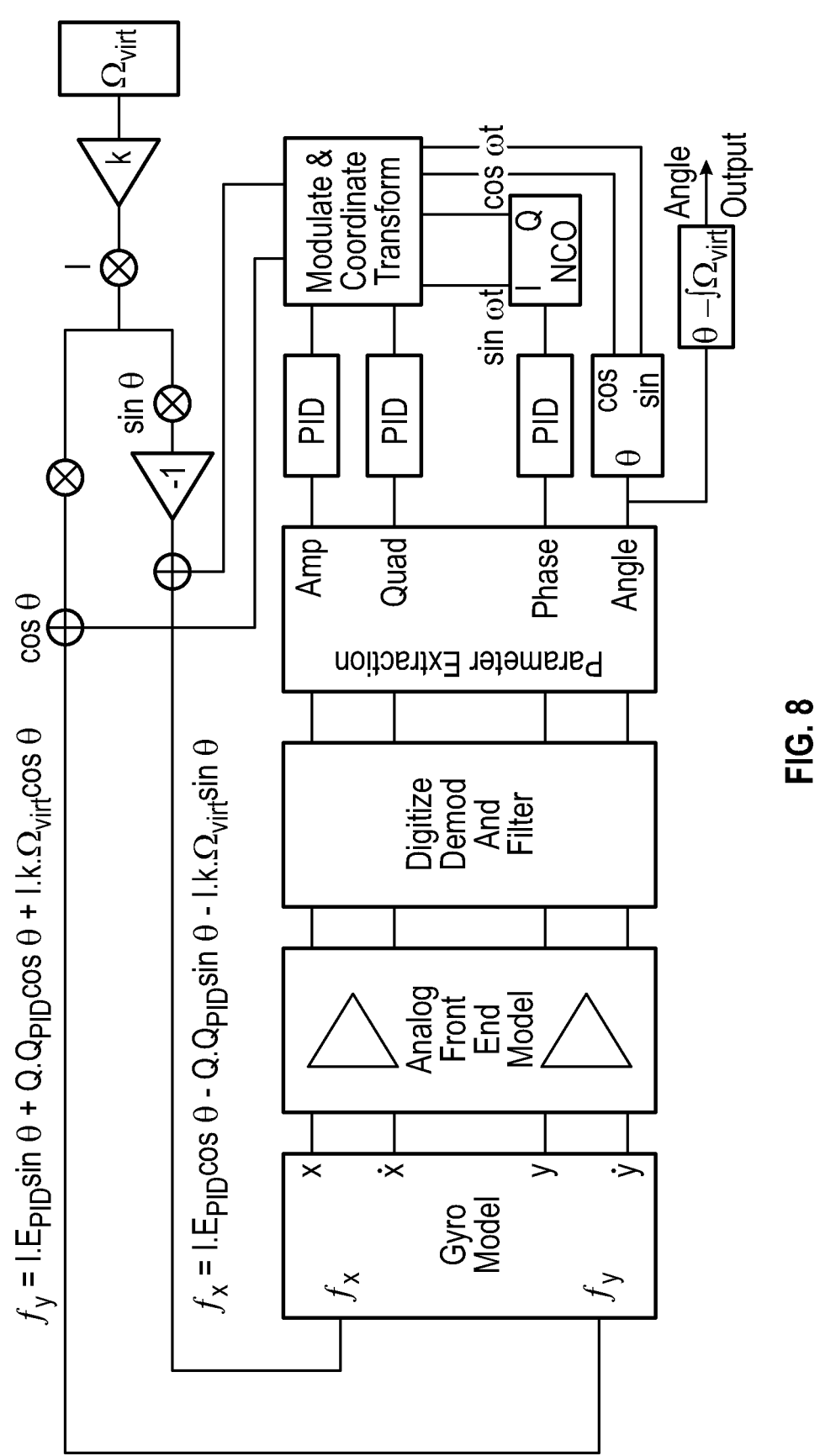
FIG. 8 is a block diagram of a control circuit for open loop control of turning and mode switching of a mode match MEMS gyroscope.

FIG. 8 is a block diagram of a control circuit for open loop control. The frequency of oscillations ω is controlled by a phased-locked loop (PILL) loop that tracks the gyro motion at any arbitrary pattern angle. With the PLL loop enabled, the Gyro Model extracts the slow-varying variables: energy (E), quadrature error (Q), and a pattern angle (θ). A set of PID controllers regulate the following: energy E (amplitude F) by the command voltage Erin, quadrature null action $Q_{PID}$, and a feedforward control $F_{VIRT}$ that continuously rotates the pattern angle (θ) at the rate $\Omega_{VIRT}$. The control forces fx, fy are applied along the pattern angle θ, which is accomplished by the coordinate transform followed by modulation of the command voltages at PLL frequency ω.

The following forces were applied to X and Y electrodes: $E_{PID}$ to control amplitude, $Q_{PID}$ to null quadrature, and $F_{VIRT}$ to set virtual rate $\Omega_{VIRT}$;

$$fx=E_{PID} \sin \omega t \sin \theta+Q_{PID} \cos \omega t \cos \theta+F_{VIRT} \sin \omega t \cos \theta,$$

$$fy=E_{PID} \sin \omega t \cos \theta-Q_{PID} \cos \omega t \sin \theta-F_{VIRT} \sin \omega t \sin \theta.$$

The forces for applying virtual rates are the same as the forces to operate the gyroscope in a rate mode if the virtual rate is controlled to operate the gyroscope at a fixed angle (either 0° or 90°).

The systems and methods described provide a MEMS gyroscope that is symmetric. The symmetry allows the drive axis and the sense axis of the gyroscope to be interchanged when the orientation of the gyroscope is turned ninety degrees. This "mode turnability" between resonator mode and Coriolis mode of the axes cancels out many common mode offset error terms and quadrature error terms that change sign by the turning of the gyroscope. This causes the error term to average out over time, allowing much smaller signals to be read from the MEMS gyroscope and improving performance by several orders of magnitude.

ADDITIONAL DESCRIPTION AND EXAMPLES

Example 1 includes subject matter (such as a gyroscope) comprising a substrate, a proof mass coupled to the substrate and configured to move in direction of an X axis and in direction of a Y axis orthogonal to the first axis, an X axis shuttle to selectively drive the proof mass along the X axis as a drive axis or sense movement of the proof mass along the X axis as a sense axis in response to the proof mass driven along the Y axis as the drive axis, a Y axis shuttle to selectively sense movement of the proof mass along the Y axis as a sense axis in response to the proof mass driven along the X axis or drive the proof mass along the Y axis as the drive axis, and wherein the X axis shuttle is symmetric to the Y axis shuttle along a diagonal axis that is diagonal to both the X axis and the Y axis.

In Example 2, the subject matter of Example 1 optionally includes a proof mass in which driving the proof mass along a selected one of the X axis or Y axis causes the proof mass to vibrate in the direction of the selected axis, and movement of the proof mass along the other axis is representative of a Coriolis force on the proof mass.

In Example 3, the subject matter of Example 1 optionally includes an X axis shuttle that includes drive-or-sense (drive/sense) electrodes symmetrical about the diagonal axis to drive/sense electrodes of the Y axis shuttle.

In Example 4, the subject matter of Example 3 optionally includes springs coupled to the proof mass, a gap space between the drive/sense electrodes of the X axis shuttle and Y axis shuttle, wherein displacement of the X and Y axis shuttles changes the gap space between the drive/sense electrodes, and wherein a predetermined DC voltage applied to the gap space causes motion frequency of the proof mass to be linear over full displacement of the X and Y axis shuttles and over a full change of the gap space due to the displacement of the X and Y axis shuttles.

In Example 5, the subject matter of one or any combination of Examples 1-4 optionally includes an X axis shuttle includes a frequency tuning electrode symmetrical about the diagonal axis to a frequency tuning electrode of the Y axis shuttle, and wherein applying a voltage to the frequency tuning electrode of the X axis shuttle or the Y axis shuttle changes a frequency of movement in the corresponding X axis or Y axis direction.

In Example 6, the subject matter of one or any combination of Examples 1-5 optionally includes multiple quadrature trimming electrodes, where the quadrature trimming electrodes are arranged in a pattern symmetrical about the diagonal axis. In Example 7, the subject matter of one or any combination of Examples 1-5 optionally includes multiple quadrature trimming electrodes, where the quadrature trimming electrodes are arranged in a pattern symmetrical about both of the X axis and the Y axis.

In Example 8, the subject matter of one or any combination of Examples 1-7 optionally includes an X axis shuttle includes one or more springs, and the Y axis shuttle includes one or more springs asymmetrical about the diagonal axis to the springs of the X axis shuttle.

In Example 9, the subject matter of one or any combination of Examples 1-7 optionally includes X axis shuttle includes one or more springs, and the Y axis shuttle includes one or more springs symmetrical about the diagonal axis to the springs of the X axis shuttle.

In Example 10, the subject matter of one or any combination of Examples 1-9 optionally includes a proof mass in which a drive displacement of the proof mass results in a change in a gap space between drive/sense electrodes of a shuttle that is at least thirty percent of the drive displacement.

Example 11 includes subject matter (such as a method of operating a micro-electromechanical systems (MEMS) gyroscope) or can optionally be combined with one or any combination of Examples 1-10 to include such subject matter, comprising driving the MEMS gyroscope along a first axis of the MEMS gyroscope as a drive axis, sensing a response of the MEMS gyroscope along a second axis orthogonal to the first axis as a sense axis, and turning the MEMS gyroscope and changing the drive axis to the second axis and changing the sense axis to the first axis.

In Example 12, the subject matter of Example 11 optionally includes applying a drive signal to a shuttle structure of the first axis to cause a proof mass of the MEMS gyroscope to vibrate in the first axis direction, sensing displacement of a shuttle structure of the second axis to sense a Coriolis effect movement of the proof mass, turning the MEM gyroscope, driving the MEMS gyroscope along the second axis to cause the proof mass to resonate in the second axis direction, and sensing the Coriolis effect movement of the proof mass along the first axis.

In Example 13, the subject matter of one or both of Examples 11 and 12 optionally includes determining sensed rotation rate information during the turning of the MEMS gyroscope.

In Example 14, the subject matter of one or any combination of Examples 11-13 optionally includes applying a drive signal to a shuttle structure of the drive axis, and tuning a voltage applied to electrodes of the shuttle structure to reduce frequency dependence of movement of the proof mass.

In Example 15, the subject matter of one or any combination of Examples 11-14 optionally includes applying a drive signal to a shuttle structure of the drive axis, and applying a voltage to electrodes of the shuttle structure to reduce non-linearity in movement of springs of the shuttle structure.

In Example 16, the subject matter of one or any combination of Examples 11-15 optionally includes applying a drive signal to a shuttle structure of the drive axis to cause movement of the proof mass, wherein a change in a gap space between electrodes of the shuttle structure is at least thirty percent of the movement of the proof mass.

In Example 17, the subject matter of one or any combination of Examples 11-16 optionally includes one or both of applying a voltage to a frequency tuning electrode of a first axis shuttle structure to change a frequency of movement in the first axis direction and applying a voltage to a frequency tuning electrode of a second axis shuttle structure to change a frequency of movement in the second axis direction.

Example 18 includes subject matter (such as a four-quadrant gyroscope) or can optionally be combined with one or nay combination of Examples 1-17 to include such subject matter, comprising a substrate, and four proof masses coupled to the substrate and each proof mass is included in one quadrant of the four quadrant gyroscope and is configured to move in direction of an X axis and in direction of a Y axis orthogonal to the first axis, Each quadrant of the four-quadrant gyroscope includes an X axis shuttle to selectively drive the proof mass along the X axis as a drive axis or sense movement of the proof mass along the X axis as a sense axis in response to the proof mass driven along the Y axis as the drive axis, a Y axis shuttle to selectively sense movement of the proof mass along the Y axis as a sense axis in response to the proof mass driven along the X axis or drive the proof mass along the Y axis as the drive axis, and wherein the X axis shuttle is symmetric to the Y axis shuttle along a diagonal axis that is diagonal to both the X axis and the Y axis.

In Example 19, the subject matter of Example 18 optionally includes wherein the X axis shuttle of each quadrant includes drive-or-sense (drive/sense) electrodes, the Y axis shuttle of each quadrant includes drive/sense electrodes, and the X axis shuttle drive/sense electrodes of cross quadrants of the four quadrants are electrically connected together and the Y axis shuttle drive/sense electrodes of cross quadrants of the four quadrants are electrically connected together.

In Example 20, the subject matter of one or both of Examples 19 and 20 optionally includes a control circuit configured to mode switch the four quadrant gyroscope between driving along the X axis and sensing along the Y axis, and driving along the Y axis and sensing along the X axis.

These non-limiting examples can be combined in any permutation of combinations. The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following aspects, the terms "including" and "comprising" are open-ended, that is, a system, device, article, composition, formulation, or process that includes elements in addition to those listed after such a term in a claim are still deemed to fall within the scope of that claim. Moreover, in the following aspects, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following aspects are hereby incorporated into the Detailed Description as examples or embodiments, with each aspect standing on its own as a separate embodiment, and it is contemplated that such embodiments can be combined with each other in various combinations or permutations.

The invention claimed is:

1. A gyroscope, comprising:
a substrate;
a proof mass coupled to the substrate and configured to move in direction of an X axis and in direction of a Y axis orthogonal to the first axis;
an X axis shuttle to selectively drive the proof mass along the X axis as a drive axis or sense movement of the proof mass along the X axis as a sense axis in response to the proof mass driven along the Y axis as the drive axis;
a Y axis shuttle to selectively sense movement of the proof mass along the Y axis as a sense axis in response to the proof mass driven along the X axis or drive the proof mass along the Y axis as the drive axis; and wherein the X axis shuttle and Y axis shuttle are positioned within a periphery of the proof mass, and the X axis shuttle is symmetric to the Y axis shuttle along a diagonal axis that is within the periphery of the proof mass and is diagonal to both the X axis and the Y axis.

2. The gyroscope of claim 1, wherein driving the proof mass along a selected one of the X axis or Y axis causes the proof mass to vibrate in the direction of the selected axis, and movement of the proof mass along the other axis is representative of a Coriolis force on the proof mass.

3. The gyroscope of claim 1, wherein the X axis shuttle includes drive-or-sense (drive/sense) electrodes symmetrical about the diagonal axis to drive/sense electrodes of the Y axis shuttle.

4. The gyroscope of claim 3, including:

springs coupled to the proof mass;

a gap space between the drive/sense electrodes of the X axis shuttle and Y axis shuttle, wherein displacement of the X and Y axis shuttles changes the gap space between the drive/sense electrodes; and wherein a predetermined DC voltage applied to the gap space causes motion frequency of the proof mass to be linear over full displacement of the X and Y axis shuttles and over a full change of the gap space due to the displacement of the X and Y axis shuttles.

5. The gyroscope of claim 1, wherein the X axis shuttle includes a frequency tuning electrode symmetrical about the diagonal axis to a frequency tuning electrode of the Y axis shuttle; and wherein applying a voltage to the frequency tuning electrode of the X axis shuttle or the Y axis shuttle changes a frequency of movement in the corresponding X axis or Y axis direction.

6. The gyroscope of claim 1, including multiple quadrature trimming electrodes, where the quadrature trimming electrodes are arranged in a pattern symmetrical about the diagonal axis.

7. The gyroscope of claim 1, including multiple quadrature trimming electrodes, where the quadrature trimming electrodes are arranged in a pattern symmetrical about both of the X axis and the Y axis.

8. The gyroscope of claim 1, wherein the X axis shuttle includes one or more springs, and the Y axis shuttle includes one or more springs asymmetrical about the diagonal axis to the springs of the X axis shuttle.

9. The gyroscope of claim 1, wherein the X axis shuttle includes one or more springs, and the Y axis shuttle includes one or more springs symmetrical about the diagonal axis to the springs of the X axis shuttle.

10. The gyroscope of claim 1, wherein a drive displacement of the proof mass results in a change in a gap space between drive/sense electrodes of a shuttle that is at least thirty percent of the drive displacement.

11. A method of operating a micro-electromechanical systems (MEMS) gyroscope, the method including:

driving a proof mass of the MEMS gyroscope along a first axis of the MEMS gyroscope as a drive axis using a first axis shuttle structure as a drive shuttle;

sensing a response of the MEMS gyroscope along a second axis orthogonal to the first axis as a sense axis using a second axis shuttle structure as a sense shuttle;

turning the MEMS gyroscope and changing the drive axis to the second axis using the second axis shuttle structure as the drive shuttle and changing the sense axis to the first axis using the first axis shuttle structure as the sense shuttle; and wherein the first axis shuttle structure and second axis shuttle structure are positioned within a periphery of the proof mass, and the first axis shuttle structure is symmetric to the second axis shuttle structure along a diagonal axis that is within the periphery of the proof mass and is diagonal to both the first axis and the second axis.

12. The method of claim 11, wherein driving the MEMS gyroscope includes applying a drive signal to the first axis shuttle structure to cause the proof mass of the MEMS gyroscope to vibrate in the first axis direction;

wherein sensing the response includes sensing displacement of second axis shuttle structure to sense a Coriolis effect movement of the proof mass; and wherein turning the MEMS gyroscope includes turning the MEM gyroscope, driving the MEMS gyroscope along the second axis to cause the proof mass to resonate in the second axis direction, and sensing the Coriolis effect movement of the proof mass along the first axis.

13. The method of claim 11, including determining sensed rotation rate information during the turning of the MEMS gyroscope.

14. The method of claim 11, wherein driving the MEMS gyroscope includes:

applying a drive signal to a shuttle structure used as the drive axis shuttle; and tuning a voltage applied to electrodes of the shuttle structure used as the drive axis shuttle to reduce frequency dependence of movement of the proof mass.

15. The method of claim 11, wherein driving the MEMS gyroscope includes:

applying a drive signal to a shuttle structure used as the drive axis shuttle; and applying a voltage to electrodes of the shuttle structure used as the drive axis shuttle to reduce non-linearity in movement of springs of the shuttle structure used as the drive axis shuttle.

16. The method of claim 11, wherein driving the MEMS gyroscope includes:

applying a drive signal to a shuttle structure used as the drive axis shuttle to cause movement of the proof mass, wherein a change in a gap space between electrodes of the shuttle structure used as the drive axis shuttle is at least thirty percent of the movement of the proof mass.

17. The method of claim 11, including one or both of:

applying a voltage to a frequency tuning electrode of the first axis shuttle structure to change a frequency of movement in the first axis direction; and applying a voltage to a frequency tuning electrode of the second axis shuttle structure to change a frequency of movement in the second axis direction.

18. A four-quadrant gyroscope including:

a substrate; and four proof masses coupled to the substrate and each proof mass is included in one quadrant of the four quadrant gyroscope and is configured to move in direction of an X axis and in direction of a Y axis orthogonal to the first axis; and wherein each quadrant of the four-quadrant gyroscope includes:

an anchor;

an X axis shuttle to selectively drive the proof mass along the X axis as a drive axis or sense movement of the proof mass along the X axis as a sense axis in response to the proof mass driven along the Y axis as the drive axis;

a Y axis shuttle to selectively sense movement of the proof mass along the Y axis as a sense axis in response to the proof mass driven along the X axis or drive the proof mass along the Y axis as the drive axis; and wherein the X axis shuttle and Y axis shuttle are positioned within a periphery of the proof mass, and the X axis shuttle is symmetric to the Y axis shuttle along a diagonal axis that bisects the anchor and is diagonal to both the X axis and the Y axis.

19. The four-quadrant gyroscope of claim 18, wherein the X axis shuttle of each quadrant includes drive-or-sense (drive/sense) electrodes, and the Y axis shuttle of each quadrant includes drive/sense electrodes; and wherein the X axis shuttle drive/sense electrodes of cross quadrants of the four quadrants are electrically connected together, and the Y axis shuttle drive/sense electrodes of cross quadrants of the four quadrants are electrically connected together.

20. The four-quadrant gyroscope of claim 18, including a control circuit configured to mode switch the four quadrant gyroscope between driving along the X axis and sensing along the Y axis, and driving along the Y axis and sensing along the X axis.

* * * * *